United States Patent
Player et al.

US 6,722,560 B2
Apr. 20, 2004

(54) HIGH PERFORMANCE BULK BOX WITH REPULPABLE WATER VAPOR BARRIER

(75) Inventors: Blair Player, Savannah, GA (US); Jon Llewellyn, Savannah, GA (US); Edward Balder, Savannah, GA (US); Frederick F. Cazenave, III, Savannah, GA (US)

(73) Assignee: International Paper Company, Tuxedo, NY (US)

( * ) Notice: Subject to any disclaimer, the term of this patent is extended or adjusted under 35 U.S.C. 154(b) by 0 days.

(21) Appl. No.: 09/814,416

(22) Filed: Mar. 22, 2001

(65) Prior Publication Data
US 2002/0050513 A1 May 2, 2002

Related U.S. Application Data

(60) Provisional application No. 60/191,378, filed on Mar. 22, 2000.

(51) Int. Cl.[7] .............. B65D 5/62; B32B 3/28
(52) U.S. Cl. .............. 229/5.84; 229/939; 428/34.2; 428/182
(58) Field of Search .............. 229/5.84, 939; 428/34.2, 182

(56) References Cited

U.S. PATENT DOCUMENTS

| 3,256,126 | A | * | 6/1966 | Bachofen | 428/182 |
| 3,307,994 | A | * | 3/1967 | Scott, Jr. | 229/939 |
| 3,308,006 | A | * | 3/1967 | Kresse et al. | 428/182 |
| 3,399,819 | A | * | 9/1968 | Rennie et al. | 229/5.84 |
| 3,691,002 | A | * | 9/1972 | Blandy | 428/182 |
| RE29,272 | E | * | 6/1977 | Hintz et al. | 428/182 |
| 4,489,120 | A | * | 12/1984 | Hollinger, Jr. | 428/182 |
| 4,790,450 | A | * | 12/1988 | Archibald | 229/939 |
| 5,256,467 | A | * | 10/1993 | Kato | 428/182 |
| 5,285,957 | A | * | 2/1994 | Halsell | 229/939 |
| 5,575,418 | A | * | 11/1996 | Wu et al. | 229/939 |
| 5,635,279 | A | * | 6/1997 | Ma et al. | 428/174 |
| 5,698,295 | A | * | 12/1997 | Benner et al. | 428/182 |
| 5,750,237 | A | * | 5/1998 | Allin et al. | 428/182 |
| 5,944,252 | A | * | 8/1999 | Connelly et al. | 229/939 |
| 6,083,580 | A | * | 7/2000 | Finestone et al. | 229/5.84 |
| 6,416,620 | B1 | * | 7/2002 | Narancic et al. | 162/5 |

\* cited by examiner

Primary Examiner—Gary E. Elkins
(74) Attorney, Agent, or Firm—Dennis H. Lambert

(57) ABSTRACT

A bulk box of corrugated cardboard has a readily repulpable water vapor barrier material incorporated in the outer liner, increasing the resistance of the box to penetration by moisture in humid conditions, and especially reducing hysteresis effects in conditions of cyclic humidity. The box has increased strength and bulge resistance, and achieves performance equally as good as or better than a conventional box without the water vapor barrier, while at the same time enabling less pulp fiber to be used in the construction of the box.

4 Claims, 4 Drawing Sheets

HIGH PERFORMANCE BULK BOX WITH REPULPABLE WATER VAPOR BARRIER

This application claims the benefit of US Provisional Patent Application Serial No. 60/191,378, filed Mar. 22, 2000.

BACKGROUND OF THE INVENTION

1. Field of the Invention

This invention relates to slotted containers (RSC's) and bulk boxes. More specifically, the invention improves the performance of slotted containers and bulk boxes susceptible to cyclic changes in ambient humidity and temperature with a repulpable water vapor barrier in the outer linerboard.

2. Prior Art

Large corrugated cardboard boxes are commonly used in the storage and shipment of bulk quantities of materials. These bulk boxes are typically designed to hold up to 2500 pounds, or more, of product, and may be stacked three or more high. During transportation and storage they may be subjected to rough handling and adverse ambient conditions. For example, during storage they are usually placed in a warehouse, which does not have a controlled atmosphere, whereby the boxes are subjected to cyclic changes in temperature and humidity.

Under conditions of high ambient moisture, and particularly cyclic changes in ambient moisture and temperature, the pulp fibers in the corrugated material experience the effect of hysteresis, whereby the fibers swell and contract as the level of moisture changes. Each cycle weakens the fibers. As the fibers weaken, the side walls of the box bulge outwardly, interfering with storage and handling, and in some cases resulting in failure of the box.

The serious loss of strength and stiffness resulting from these cyclic conditions, and the consequent dimensional change and potential failure of the box, shortens the shelf life and limits the number of boxes, which can be stacked.

Historically, fiber loading has been the only means to combat the deleterious effect of hysteresis. The total weight a box will have to support during its life cycle is calculated and then multiplied by a safety factor. The amount of the safety factor is based on the conditions the box is expected to endure. In some instances, boxes are produced with a safety factor of 8:1, i.e., the box is produced eight times as strong as needed. This obviously increases the amount of material and thus the cost of construction of the box.

Efforts have been made in the prior art to improve the performance of corrugated bulk boxes, as exemplified by the following patents.

U.S. Pat. No. 1,161,818 discloses a corrugated shipping container having an outer liner formed of plural laminated plies to improve the resistance of the container to ambient conditions and rough handling. The outer liner is described as being a plural ply fiber paste-board that is preferably of a solid, firm and hard texture comprising several plies of paper united together by silicate of soda or other strong paste or cement. Page 1, lines 100–110, and page 2, lines 1–10.

U.S. Pat. No. 3,616,010 discloses a corrugated shipping container having a thermoplastic film to make it moisture resistant for use in high humidity conditions. More specifically, a roll 16 of kraft paper bag stock in the range of 17 lbs/MSF coated with a layer 22 of thermoplastic material such as polyethylene, polypropylene, etc., is laminated with a kraft linerboard 26 of, e.g., 26 lbs/MSF, to form a laminated linerboard 34, which is then laminated with the corrugated medium 42. The PE imparts moisture resistance to the structure, but the moisture resistant material, PE, is not recyclable.

U.S. Pat. No. 5,562,980 teaches a multi-layer repulpable paper or paperboard construction that has good moisture vapor barrier qualities and mechanical strength, and that has utility as a wrapper for paper rolls or as a linerboard for corrugated boxes. The barrier material comprises a multi-layer laminant interposed between two paper sheets forming linerboard. This patent uses polyvinylidene chloride (PVdC) as the moisture barrier material. The patentee recognizes that with this material it is difficult to achieve a continuous film that provides the desired moisture protection. Moreover, the patentee recognized that because PVdC is partially soluble in water, prior to his invention it had to be applied at high rates in order to achieve an acceptable level of moisture protection. Further, PVdC has a negative impact on the environment and can cause problems when discharged from a recycling facility into a waste effluent stream. The patentee discovered that by the use of appropriate primer and laminate materials, the moisture barrier material, PVdC, can be applied at a low rate, enhancing recyclability without impairing its qualities as a barrier layer. Clay is disclosed as a suitable inorganic pigment useful in the primer layer.

U.S. Pat. No. 5,609,293 discloses a corrugated container for prolonging the life of fresh fruits and vegetables by, at least in part, controlling the gas permeability of the container, and to this end incorporates a plastic-paperboard liner construction having a kraft paper outer layer 5, an intermediate polymeric film layer 6, and an inner kraft layer 4, laminated to a corrugated medium 8. It appears that this liner construction is placed on the inside of the container. The examples identify polyethylene as the polymeric material used in the liner.

U.S. Pat. No. 5,698,295 discloses a corrugated box with inner and outer liners coated with a repulpable moisture resistant material to improve the performance of the container under high humidity conditions. The moisture resistant property of the container is imparted by coatings 20 and 22, respectively, of repulpable moisture resistant material on the outer faces of the liners, applied by rod coating. The outer coating accepts printing. An example of a suitable coating 22 for the outer surface is identified as a white, water-based, tri-polymer blend of the type sold by Progressive, Inc. of Shreveport, La., under the designation W-108 White Coating. This coating is applied to 69 # linerboard, with a corrugated medium of 33 # weight.

The prior art which teaches the use of a moisture barrier material on a bulk box either does not use a readily repulpable barrier material, and/or uses a material which can have a negative environmental impact, and/or uses materials and processes which are unacceptably expensive.

Accordingly, there is need for a bulk box having an inexpensive and readily repulpable water vapor barrier material incorporated therein to increase resistance of the corrugated material to the effects of ambient humidity, and especially to cyclic changes in ambient moisture and temperature, thereby improving the performance of the box under these conditions.

SUMMARY OF THE INVENTION

As a box fatigues under top load, its sidewalls begin to bulge outward. The degree of bulge is directly related to the top to bottom compression the box can withstand. The more resistant to bulge a box is, the more weight it can support. The measurement of bulge over time will relate to the condition of a box under load as well as the potential life cycle of that box.

The present invention comprises a bulk box or slotted container having an inexpensive and readily repulpable water vapor barrier material incorporated therein to increase resistance of the corrugated material to the effects of ambient humidity, and especially to cyclic changes in ambient moisture and temperature. The improved performance under these conditions will allow for a reduction in the safety factor in any slotted container or bulk box enabling less pulp fiber to be used in the construction of the box.

The bulk box or slotted container of the invention has enhanced stacking strength, especially in cyclic environments, and by reducing or eliminating the transmission of moisture through the corrugated material, a lighter grade of box can be produced which performs equally as well as or better than the heavier weight boxes previously required.

Applicant previously developed a repulpable roll wrap to replace the polyethylene coated and laminated roll wrap used by fine paper mills to wrap large rolls of paper. This roll wrap uses a repulpable Michelman MVTR barrier as a bonding agent in a two ply linerboard laminate.

Applicant has discovered that the repulpable Michelman MVTR barrier used in its roll wrap can be incorporated in the outer linerboard on a bulk box to impart moisture resistance to the bulk box and improve its performance while requiring less pulp fiber than prior constructions not employing the water vapor barrier.

More specifically, the outer liner of a bulk box according to the present invention comprises two plies of either 26 #/MSF or 33 #/MSF kraft paper (linerboard) bonded together using the "Vaporcoat" 117B water vapor barrier material produced by Michelman, Inc. of Cincinnati, Ohio.

In a preferred construction, the water vapor barrier is applied with a rod coater to the felt side of the inner ply of the linerboard laminate, and the coated inner ply is mated to the wire side of the outer ply. This leaves the felt side of the outer ply available for printing. This laminated structure also has significantly higher ring crush strength than a non-laminated comparable weight linerboard.

The Michelman "Vaporcoat" barrier is a composition of polymers and ground up mica which forms the moisture vapor resistant layer. In a specific construction, the barrier coating is applied at the rate of 10–12 wet pounds per one thousand square feet (10–12 wet #/MSF).

It is possible that other readily repulpable water vapor barrier materials may perform well in the invention, and applicant should not be limited to the specific Michelman "Vaporcoat" 117B material. Additionally, a laminated construction of the outer liner may not be required for all applications, and a single ply linerboard coated with the moisture barrier may perform satisfactorily in some applications.

Bulk boxes produced in accordance with the invention show a 700% improvement in their resistance to cyclic creep as compared with a standard construction under identical conditions. The invention thus results in significantly improved performance and reduction in the cost of bulk boxes and certain RSC's.

BRIEF DESCRIPTION OF THE DRAWINGS

The foregoing as well as other objects and advantages of the invention will become apparent from the following detailed description when considered in conjunction with the accompanying drawings, wherein like reference characters designate like parts throughout the several views, and wherein.

DETAILED DESCRIPTION OF THE PREFERRED EMBODIMENTS

Figure 1:
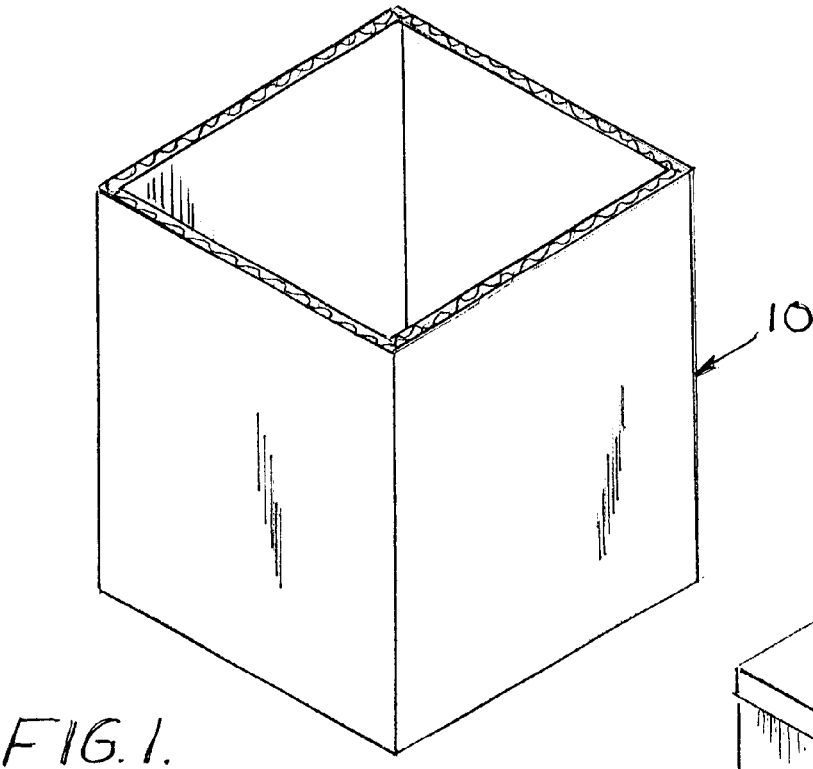
FIG. 1 is a top perspective view of a typical bulk box according to the invention, shown without a cover.
Figure 2:
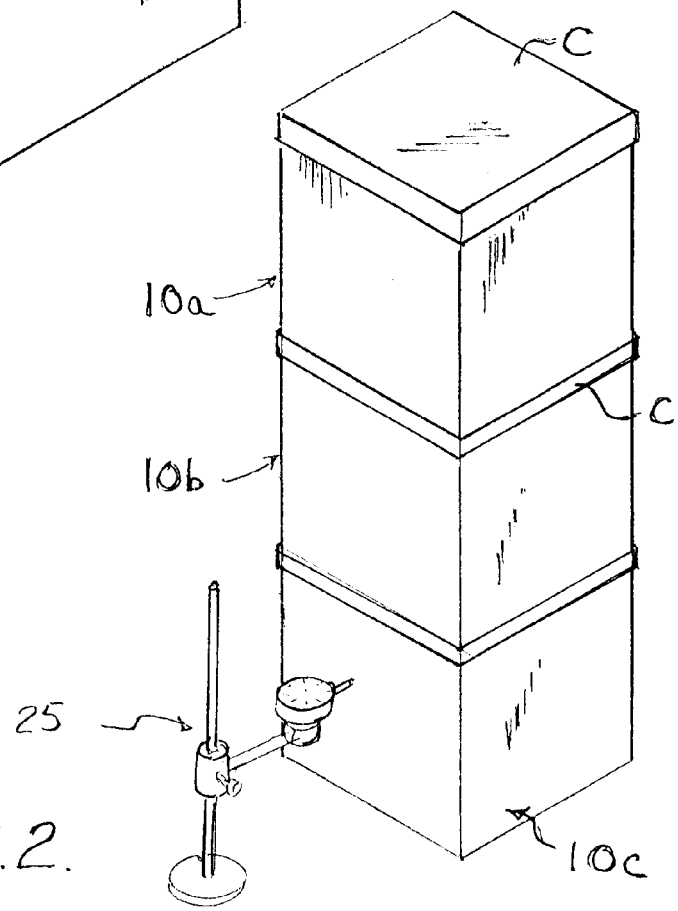
FIG. 2 is a top perspective view of a plurality of the bulk boxes stacked on top of one another.

A bulk box according to the invention is indicated generally at 10 in FIG. 1, without a cover. In the example shown, the box is of rectangular cross-sectional configuration, although it could have other shapes, e.g., octagonal. The boxes, with covers C, may be stacked on top of one another as shown at 10a, 10b and 10c in FIG. 2.

Figure 3:
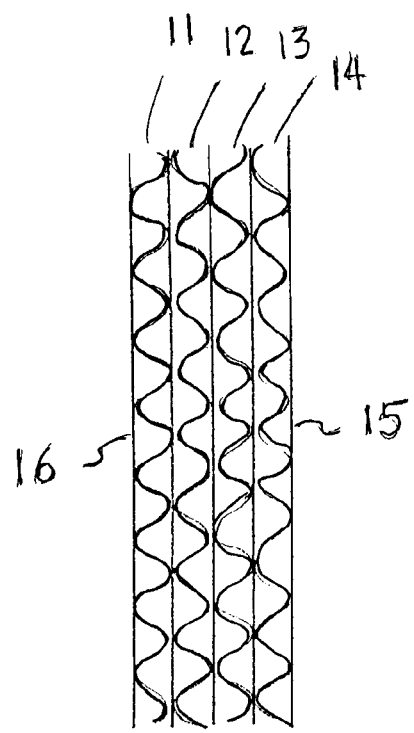
FIG. 3 is an enlarged schematic transverse cross-sectional view of a section of a corrugated cardboard bulk box wall incorporating an outer liner according to the invention.

The box is constructed of corrugated cardboard, and may have multiple plies 11, 12, 13 and 14, as depicted in FIG. 3. A suitable liner 15 of kraft paper, for example, is placed on the inner surface of the box, and a liner 16 according to the invention is placed on the outer surface.

Figure 4:
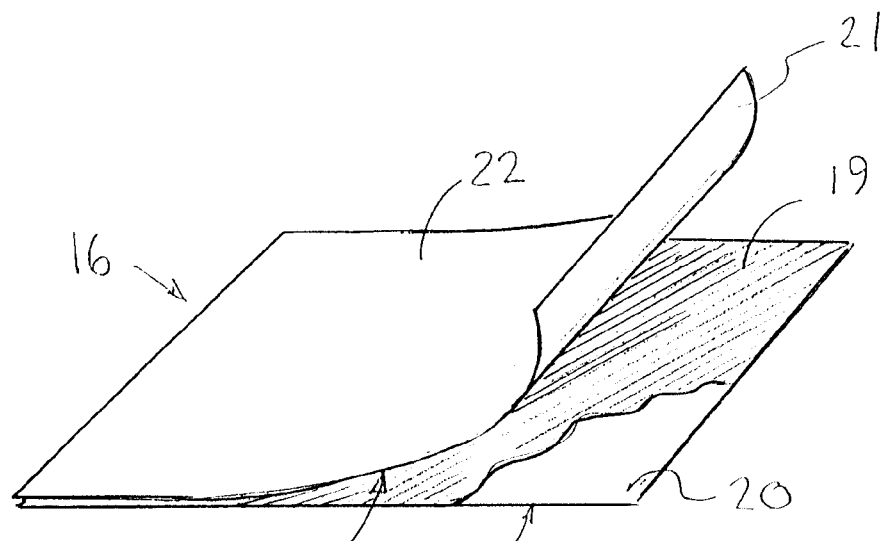
FIG. 4 is a greatly enlarged schematic transverse cross-sectional view of the laminated outer liner used in the bulk box of the invention.

As depicted in FIG. 4, the liner 16 is made up of two 26 or 33 #/MSF linerboards 17 and 18, bonded together with a layer 19 of Michelman "Vaporcoat" 117B, applied with a rod coater (not shown). The layer 19 is preferably placed on the felt side 20 of the inner linerboard 18, and mated with the wire side 21 of the outer linerboard or ply 17, thus leaving the felt side 22 of the outer ply available for printing.

A dial indicator 25 is shown associated with the bottom box 10c to measure sidewall bulge during tests, discussed below.

Experiment 1

A trial was undertaken at applicant's Lafayette plant to determine if the addition of a water vapor barrier to the outside linerboard would dampen the effect of cyclic humidity. Laminated linerboard from two different suppliers was evaluated in the trial. One trial roll was supplied by applicant's Tifton, Ga., facility and consisted of two 33 lb/MSF linerboards laminated with Michelman "Vaporcoat" 117B. A second trial roll was purchased from Fortifiber Corporation in Hanahan, S.C. This roll was also a laminated construction using two 33 lb/MSF linerboards and an aqueous-based coating.

Results

Tables 1 through 3 show the Water Vapor Transmission Rate (WVTR) test results for the two trail rolls. WVTR was evaluated in the cross-machine direction with #1 being the operator side and #5 being the drive side. Tables 1 and 2 show the WVTR for the roll produced at Tifton by applicant. Table 1 samples were taken at time of manufacture. Table 2 samples were taken in Lafayette just prior to the corrugating trial. There appears to be an upward shift in the test data. The reason for this apparent shift is unclear. There is approximately a one-month period separating these dates. It could be the result of variation in coating application or perhaps a "curing" of the coating changed the outcome slightly.

TABLE 1

(Water vapor transmission rate (WVTR) for applicant's Tifton roll. Samples taken at time of manufacture.)

| Sample | WVTR - 73° F.; 50% RH (g/m²/24 hr) | WVTR - 100° F.; 90% RH (g/m²/24 hr) |
|---|---|---|
| 1 | 1.30 | 16.2 |
| 2 | 1.28 | 15.9 |
| 3 | 1.70 | 18.2 |
| 4 | 1.75 | 22.1 |
| 5 | 1.80 | 22.3 |
| Average | 1.57 | 18.9 |
| Standard Deviation | 0.25 | 3.1 |

TABLE 2

(Water vapor transmission rate (WVTR) for applicant's Tifton roll. Samples taken at Lafayette plant.)

| Sample | WVTR - 73° F.; 50% RH (g/m²/24 hr) | WVTR - 100° F.; 90% RH (g/m²/24 hr) |
|---|---|---|
| 1 | 8.22 | 54.5 |
| 2 | 2.90 | 19.4 |
| 3 | 3.10 | 22.5 |
| 4 | 3.18 | 23.5 |
| 5 | 3.95 | 29.9 |
| Average | 4.27 | 30.0 |
| Standard Deviation | 2.24 | 14.3 |

TABLE 3

(Fortifiber water vapor transmission rate (WVTR). Samples taken at Lafayette plant.)

| Sample | WVTR - 73° F.; 50% RH (g/m²/24 hr) | WVTR - 100° F.; 90% RH (g/m²/24 hr) |
|---|---|---|
| 1 | 0.92 | 9.09 |
| 2 | 1.15 | 10.5 |
| 3 | 1.19 | 12.3 |
| 4 | 1.21 | 11.3 |
| 5 | 1.21 | 11.9 |
| Average | 1.14 | 11.0 |
| Standard Deviation | 0.12 | 1.26 |

Material from each laminated linerboard roll was converted into a CA-flute combination utilizing 33 lb. medium and 42 lb. liner. The laminated liner was run on the double-back side. Sample sheets of the trial material as well as control sheets were shipped to the lab. The sample sheets were cut on the CAD table into 17"×17"×17" RSC's for compression testing and cyclic chamber testing. All samples were preconditioned at 73° F. and 20% relative humidity (RH). Seven sample boxes were compression tested at TAPPI standard conditions (73° F.; 50% RH) and seven at tropic conditions (100° F.; 90% RH). Compression results are shown in Table 4.

The control samples lost an average 28.4% compression strength between standard and tropic conditions. Boxes made with Fortifiber product lost 12.2% compression strength and those made with Tifton product lost 15.8%. Another way to view performance is on a pound of crush per pound of fiber basis. This is achieved by dividing the compression strength at the various conditions by the nominal basis weight of the combined board. This normalizes the data so that compression strength can be compared regardless of the board combination. As shown in Table 4, strength retention at high humidity was greater in those samples manufactured using laminated linerboard with a vapor barrier. Fortifiber and Tifton samples averaged 9.9 pounds of crush per pound of fiber at tropic conditions while the control samples averaged 7.4 pounds of crush per pound of fiber at tropic conditions.

Equilibrium moisture content was measured at TAPPI and tropic conditions in order to determine moisture gain between the two relative humidity levels. The control samples picked up an additional 3% moisture, while boxes made with the Fortifiber and Tifton products gained 1.5% and 2.4% respectively.

TABLE 4

(Compression test results.)

| | Sample* | | | | | | | |
|---|---|---|---|---|---|---|---|---|
| | A | | B | | C | | D | |
| | Board Combination | | | | | | | |
| | 90/40/42/40/42 CA | | 69//33/42/33/42 CA | | 33//33/33/42/33/42 CA | | 33//33/33/42/33/42 CA | |
| | Condition | | | | | | | |
| | TAPPI | Tropic | TAPPI | Tropic | TAPPI | Tropic | TAPPI | Tropic |
| Laminated Liner WVTR (g/m²/24 hr) | — | — | — | — | 1.1 | 11.0 | 43 | 30.0 |
| Compression Strength (lb_f) | 2954 | 2100 | 2664 | 1923 | 2836 | 2491 | 2887 | 2431 |

TABLE 4-continued (Compression test results.)

| | Sample* | | | | | | | |
|---|---|---|---|---|---|---|---|---|
| | A | | B | | C | | D | |
| | Board Combination | | | | | | | |
| | 90/40/42/40/42 CA | | 69/33/42/33/42 CA | | 33//33/33/42/33/42 CA | | 33//33/33/42/33/42 CA | |
| | Condition | | | | | | | |
| | TAPPI | Tropic | TAPPI | Tropic | TAPPI | Tropic | TAPPI | Tropic |
| Pound Crush per Pound Fiber | 10.1 | 7.2 | 10.6 | 7.6 | 11.4 | 10.0 | 11.6 | 9.8 |
| Moisture Content (%) | 7.2 | 10.5 | 7.0 | 10.0 | 6.2 | 7.7 | 6.3 | 8.7 |
| Compression Loss (%) | 28.9 | | 27.8 | | 12.2 | | 15.8 | |

A & B = control samples, C = Fortifiber, D = Tifton

Figure 5:
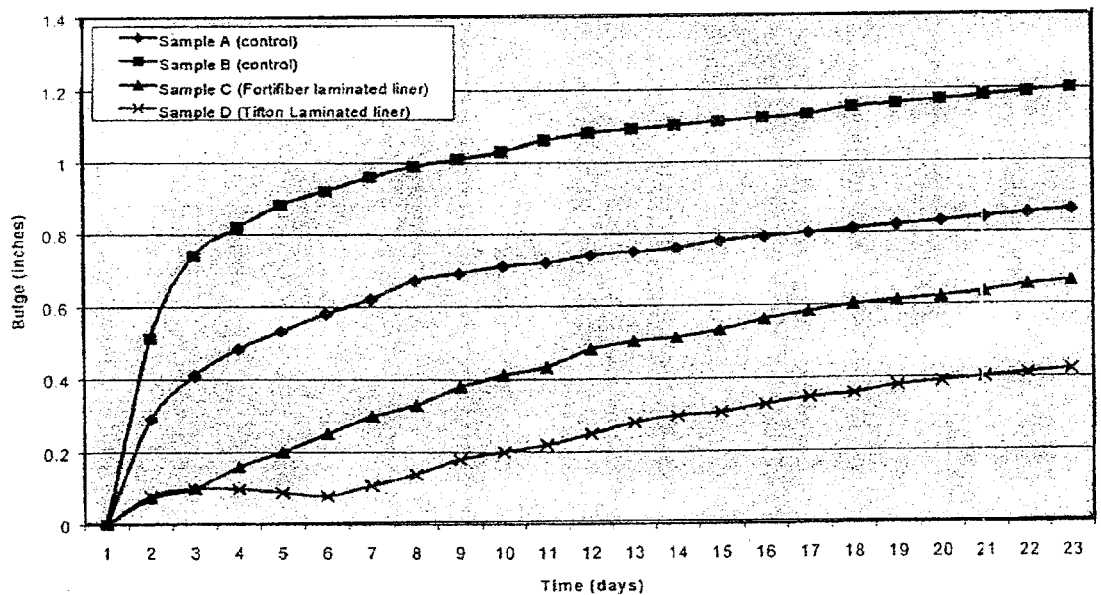
FIG. 5 is a plot of sidewall bulge over time.

The remaining RSC samples were used in a static load test to measure their performance under cyclic humidity conditions. Each box was filled with 100 lbs. of resin leaving approximately two inches of headspace. The boxes were stacked three high in the cyclic humidity chamber. The atmosphere in the room cycled between the following conditions every 12 hours: 70° F. at 90% RH and 110° F. at 70% RH. A dial gage 25 was placed in the center of the panel on the bottom box 10c to record the sidewall bulge. The amount of bulge was recorded daily and the results were plotted as shown in FIG. 5 (Graph 1).

While using a laminated linerboard with a vapor barrier does not eliminate bulge, the plots in Graph 1 suggest that the effects of cyclic humidity can be significantly dampened. The influx of water vapor into the box is inhibited, strength and stiffness losses are reduced, and the structure resists creep and bulge. Samples manufactured with the vapor barrier material retained 86% of compression strength at elevated temperature and humidity conditions as compared with 72% retention by the control samples without a vapor barrier.

Experiment 2

Following successful completion of the laboratory trials, two sets of trial boxes were produced at applicant's Lafayette box plant for use in conducting field trials to determine the performance of the boxes under actual field conditions. These two boxes comprised a control box constructed identically to a conventional box being manufactured, and a trial box dimensionally the same as the control box, but produced with lighter weight liners and mediums and having the moisture barrier coating applied to the outer linerboard.

The double back (outermost) liner comprised two 33 #/MSF linerboards laminated together with a Michelman "Vaporcoat" 117B water vapor barrier material. The layer of moisture barrier material was coated on the felt side of the inner ply, and this ply was then mated with the wire side of the outer ply and bonded thereto via the coating. See Table 2 for the physical properties of the control and trial boxes.

Compression, vibration and MVTR testing were conducted under various environmental conditions on standard grade laminated bulk boxes with and without MVTR coatings. The intent of the testing was to determine equivalency of performance between the two box variables at different conditions. Comparisons were made between boxes conditioned at standard TAPPI conditions (50% RH, 73° F.), Tropic conditions (90% RH, 90° F.) and a 24 hour cycle between the two conditions.

A shelf life based on moisture absorption rate was determined for both variables. The results indicate that the MVTR barrier effectively enhanced the performance measures under humid conditions.

The tests demonstrate the desirability of utilizing an MVTR barrier to minimize the effects of hysteresis, thus enhancing the stacking strength of laminated bulk boxes. By reducing/eliminating the transmission of moisture through the corrugated structure a lighter grade of box can be produced which will perform equally as well or better than the heavier weight box, especially in cyclic environments.

The field trials were run by applicant's Lafayette box plant to simulate real life warehouse conditions. Boxes were filled with 1000 lbs. of resin and stacked three high in an unconditioned warehouse. Bulge was measured and recorded over a 120 day period. The field trial showed a significant improvement in performance by the MVTR box.

Experimental Methods and Material:

The purpose of this testing was two-fold: (1) to validate the theory that by reducing/eliminating the transmission of moisture through a corrugated structure a lighter grade of box can be produced which will perform equally as well or better than a heavier weight box; and (2) to determine if the enhanced performance will degrade over time after continual exposure (shelf life). The distribution and barrier labs were utilized to address both issues. Table 5 shows the conditions for both warehousing and transportation provided to the Packaging Evaluation Group.

TABLE 5

| Box Weight | No. Stacked | Maximum Load on Bottom Box | Length of Time of Storage | Mode of Transportation |
|---|---|---|---|---|
| A. Warehousing: | | | | |
| 1000 lbs. | 3 | 2150 lbs. | >6 months | |
| B. Transportation and Handling: | | | | |
| 1000 lbs. | 2 | 1075 lbs. | | Truck/Rail |

Warehousing—Conditioning/Compression

Preliminary compression testing was conducted on two bulk box variables: current (no MVTR coating) and test (with MVTR coating). Variables were tested, empty, to determine the bulk box strength. All variables were erected and allowed to condition for a period of 72 hours within the specified test environment. The empty box variables were also compression tested with and without internal restraints to evaluate compression failure modes. Compression tests were conducted using a 30,000-pound capacity Tinius Olsen compression tester last calibrated on Sep. 7, 1999. These compression tests were conducted on boxes conditioned at both TAPPI (73° F./50% RH) and 90° F./90% RH environments. Table 7 details the test conditions and compression results from this preliminary evaluation.

Transportation and Handling—Conditioning/stacking/vibration/compression

One of each variable, Control and Test/MVTR, were palletized and filled with 1000 pounds of polypropylene resin. Variables were initially measured for bulge at three locations along the side-wall of each palletized and filled box. Identical pallets were used. The measurement locations were marked and consistent on each box variable. These locations were, measuring from the floor and up the sidewall of the box, at 14, 25 and 32 inches. The three bulge values were added together for a single bulge reading. A palletized load equaling 2000 pounds was then squarely applied to the top of each bulk box and bulge was again measured after a five-minute period. This second bulge measurement was used as a bulge baseline.

The two variables were then placed into a cyclic environment where bulge was measured (at the three locations and readings tracked) daily. The cyclic environment consisted of 90° F/90% RH for a 24-hour period, followed by a 24-hour period at 73° F./50% RH. Bulge was measured after each cycle. Testing was conducted though this 48-hour cycle until bulge from field trials were exceeded. Based on the first two test cycles, it was determined that a seven day test duration was sufficient.

Once considered failed, both bulk boxes were subjected to a handling test. The handling test consisted of either compression to failure or vibration for one hour under 1000 pounds load then compression to failure. Table 8 details the delta bulge values at the conclusion of each set's cycle. Table 9 details the handling test results for these same test sets.

In addition, one set of each bulk box was palletized and filled as above. A 2000 pound load was applied to each, bulge measured, and storage was maintained in a consistent TAPPI environment of 73° F./50% RH. Bulge was measured daily in this environment. As a result of less cyclical stress on the bulk box, in a consistently lower humidity environment of 50%, bulge never did exceed 5 inches. After a period of 43 days testing was stopped and both variables were compression tested to failure. These data points are also included in Tables 8 and 9.

Shelf Life—MVTR

Moisture vapor transmission through the barrier coating of the bulk box liner was determined at 73° F./50% RH and 90° F./90% RH using TAPPI methods T- 448 and T-464, respectively. Eight samples of the WVTR barrier liner were cut from roll stock and four tested at each condition.

Results and Discussion:

TABLE 6

(Box Physical Properties)

A. Control Box:

Board Combination: 90/40/42/40/42‖42/40/42/40/42/40/90 CAA
Basis Weight, Lb/MSF: 688

B. Trial Box:

Board Combination:
33‖33/36/33PL/36/35PL‖35PL/36/35PL/36/35PL/36/74PL CAA
Basis Weight, Lb/MSF   587

* Basis weight is calculated based on nominal board weights and excluding the weight of the lamination and adhesives.

TABLE 7

Average Top To Bottom Compression:

|  | @ 73° F./50% RH | @ 90° F./90% RH | % Loss |
|---|---|---|---|
| Control Box: | 18,160 @ 1.19 inch deflection | 12280 @ 1.04 inch deflection | 32.4 |
| MVTR Box: | 15,265 @ 1.11 inch deflection | 11940 @ inch deflection | 21.3 |

* Due to the size of the sidewalls, it is standard practice to use internal restraints when compression testing bulk boxes. Restraints were used for the 73° F./50% samples but were not able to be used on the 90° F./90% boxes since they were set up and sealed prior to conditioning. It should be noted that a portion of the compression loss is attributed to the lack of restraints. This effect however has no bearing on the comparative results between the two variables.

Figure 6:
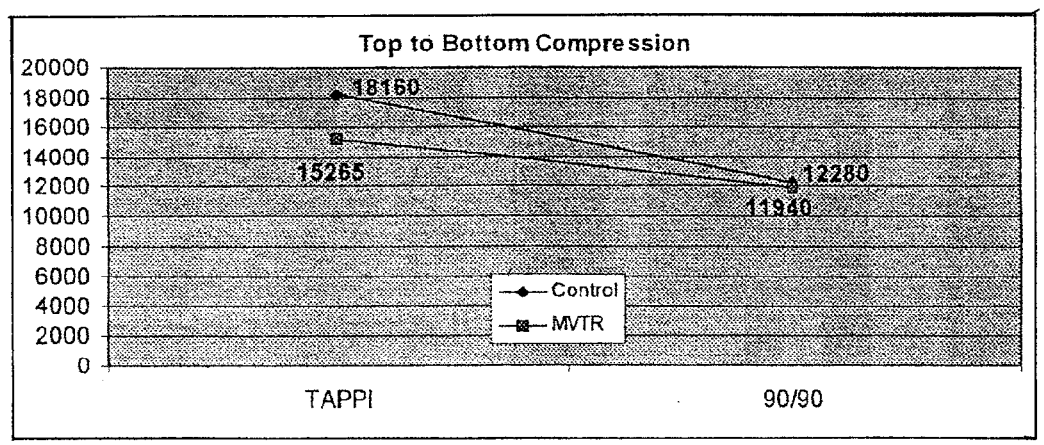
FIG. 6 is a plot of top to bottom compression.

The average top to bottom compression under the different conditions indicated in Table 7 is plotted in FIG. 6 (Graph 2). It is significant to note that whatever strength advantage the control box held at 50% RH was lost at 90% RH. While being constructed with 14% more fiber, after 72 hours @ 90% RH, the control box achieved less than 3% additional strength than the MVTR box.

TABLE 8

(Bulge Measurements Over Time Cyclic Study)

| Test Duration | Variable | Total Bulge |
|---|---|---|
| 24 Hrs @ 90° F./90% RH: | | |
| Set 1    20 Days | Control | 13.7 inches |
|  | MVTR | 6.0 inches |
| Set 2    16 Days | Control | 7.9 inches |
|  | MVTR | 4.6 inches |
| Set 3    7 Days | Control | 7.5 inches |
|  | MVTR | 3.7 inches |
| Set 4    7 Days | Control | 7.1 inches |
|  | MVTR | 1.5 inches |
| 24 Hrs @ 73° F./50% RH: | | |
| Set 1    43 Days | Control | 1.0 inches |
|  | MVTR | 1.2 inches |

Figure 7:
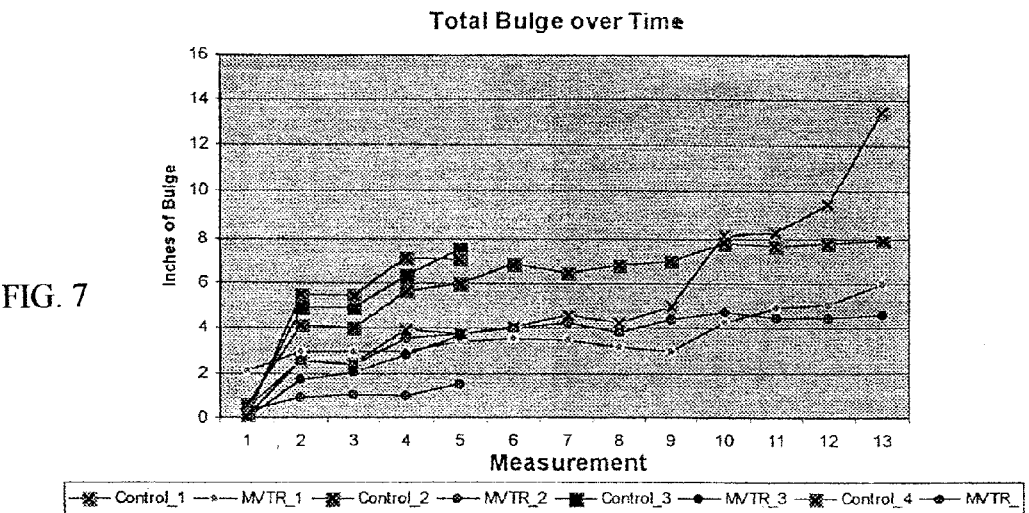
FIG. 7 is a plot of total bulge over time.

These results are plotted in FIG. 7 (Graph 3).

Points of significance relative to Graph 3, appearing in FIG. 7, include the measurement point, which does not always correlate to days conditioned. Also, measurements were not taken over weekends (for example). The results in sample Set 1 are skewed due to problems with the conditioning chambers during the first portion of the test. Regardless of the actual conditions, the results were included in this study since both variables were exposed to them for the same time. It does explain why the Control Box took longer in the first series to reach extreme bulges then in the last three. In all instances, the MVTR box outperformed the Control box. The Control Box not only reached a greater bulge then the MVTR box, it did so at a much quicker rate. Initial field studies hinted at a point in time when the bulge values of both boxes would be equal, a point when the "two lines would cross". However, the controlled study did not support this argument.

TABLE 9

Transportation and Handling
(Conditioning/stacking/vibration/compression)

| | | Handling Test | | |
|---|---|---|---|---|
| Test Condition | Variable | Conditioning Under Load (2000 lbs) | Vibration Under Load (1000 lbs) | Maximum Compression Load |
| "Cyclic" Tested after 90 F./90% RH | | | | |
| Set 1 | Control | Yes | No | 5380 lbs. @ .084 |
| | Test/MVTR | Yes | No | 9740 lbs. @ 1.13 |
| Set 4 | Control | Yes | Yes | 7477 lbs. @ 0.59 |
| | Test/MVTR | Yes | Yes | 13100 lbs. @ 1.41 |
| "Cyclic" Tested after 73° F. /50% RH | | | | |
| Set 3 | Control | Yes | Yes | 7590 lbs. @ 0.83 |
| | Test/MVTR | Yes | Yes | 8190 lbs. @ 0.69 |
| Set 2 | Control | Yes | No | 8847 lbs. @ 0.60 |
| | Test/MVTR | Yes | No | 8861 lbs. @ 0.84 |
| "Non-Cyclic" Tested at 73° F./50% RH | | | | |
| | Control | Yes | No | 15166 lbs. @ 1.08 |
| | Test/MVTR | Yes | No | 12958 lbs. @ 1.01 |

Figure 8:
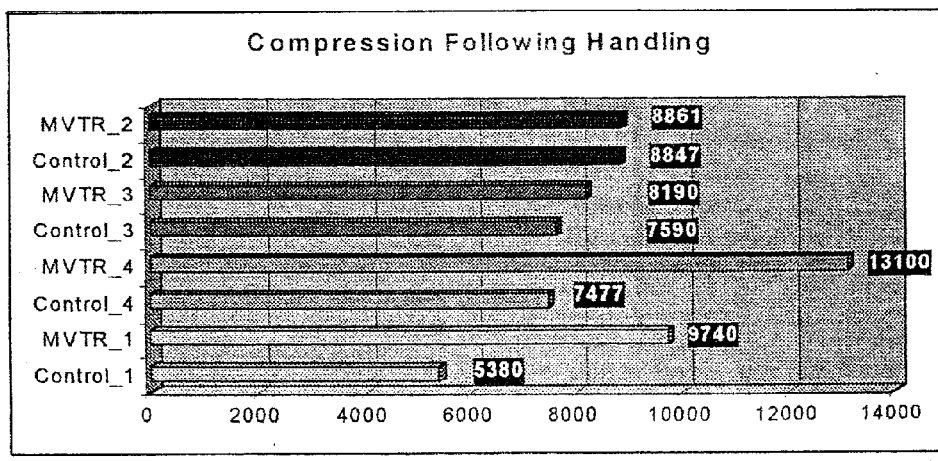
FIG. 8 is a plot of compression following handling.

Compression of the box under the different conditions shown in Table 9 is plotted in FIG. 8 (Graph 4). Points of significance to note are when the handling/compression tests followed the 90° F./90% RH phase, the MVTR box was on average 44% stronger than the Control bulk box. When the handling/compression tests followed the 73° F./50% RH phase, the MVTR box is on average 2% stronger than the Control bulk box. The Control bulk box at 73° F./50% RH is 14.6% stronger than the Test/MVTR box. There were no failures observed during vibration, and due to the built in safety factors, this is an expected result.

Shelf Life—MVTR

In order to use the MVTR to estimate the lifetime of the box due to moisture gain, the maximum moisture content of the bulk box was determined. Based on the weight gain of a 144 in² sample stored at tropic conditions for 20 days, the maximum moisture content for both the MVTR barrier box and the control box is approximately 13%.

TABLE 10

| Condition | MVTR gms/100 in 2/day |
|---|---|
| 73° F./50% RH | 0.175 |
| 90° F./90% RH | 0.786 |

An equilibrium moisture calculation for containers based on the MVTR of the coating and the weight of materials in the container has been developed (reference 1). Shih has determined the equilibrium moisture content and shelf life of cocoa mix stored in barrier pouches at high relative humidity. The derived equations can be applied to any moisture barrier where the MVTR and the moisture content of a stored material at the specified humidity condition are known. By assuming little or no interaction of moisture with the contents of a bulk, corrugated box, we can assume that the moisture absorption will be primarily within the box structure.

Figure 9:
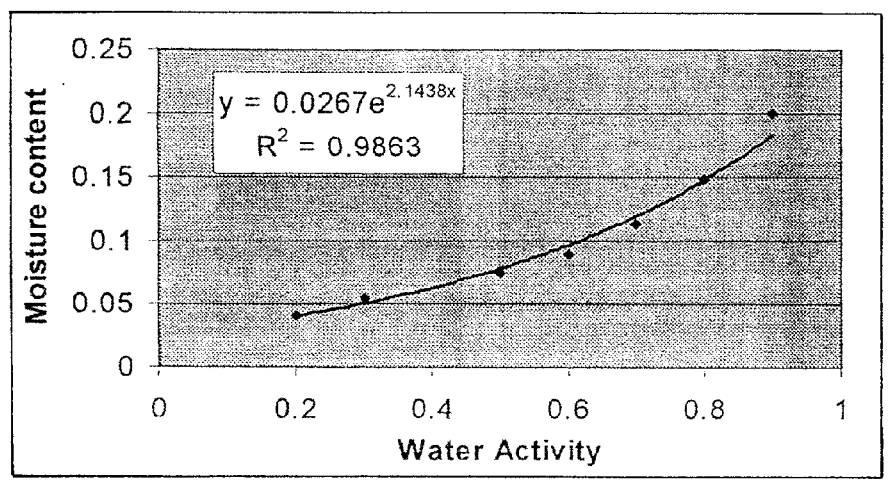
FIG. 9 is a plot of relative humidity versus percent moisture content.

A plot of relative humidity ($A_w$=water activity) vs. percent moisture content for linerboard is shown in FIG. 9 (Graph 5). The plot follows the relationship $$\text{Moisture Content} = \alpha * \exp^{bA_w} \quad (1)$$

Ultimately, the "shelf life" or lifetime of the container as it relates to moisture absorption is expressed as an integral of the following equation and constant, $$f(M) = 1/(RH*b - \ln(M/\alpha)) \quad (2)$$

$$\text{Constant} = (MVTR*A*P_0/(P_1*W*b))^{-1} \quad (3)$$

$$\text{Shelf Life} = \text{Constant} * \int_i^j f(M) dM \quad (4)$$

where i and j are the initial and final values for moisture content (M) over the range of test conditions (in this case, i=9.2% and j=13%). $P_0$ and $P_1$ are the moisture partial vapor pressure (mm Hg) for the testing condition and the MVTR measurement, respectively. "A" is the surface area of the package in 100 in². "W" is the weight of the package in grams. MVTR is in grams/100 in²/day.

The values for the constants and equation solutions for both the MVTR barrier box and the control box are shown in Table 11 and Table 12. For purposes of comparison, the MVTR of a non-MVTR liner is estimated to be at least 20 gms/100 in²/day.

TABLE 11

MVTR Box Calculations for "Shelf-Life" Due to Moisture Absorption

| a | B | RH | WVTR | i | j | w | P₀ | P₁ | A |
|---|---|---|---|---|---|---|---|---|---|
| 0.0267 | 2.1438 | 0.9 | 0.786 | 0.075 | 0.18 | 14100 | 49.692 | 49.692 | 71.36 |
| | | | | 0.092 | 0.13 | | | | |

| | actual | theoretical |
|---|---|---|
| constant | 538.92 | 538.92 |
| equation j | 2.89 | 47.33 |
| equation i | 1.44 | 1.12 |
| shelf life (days) | 776.65 | 24907.96 |

TABLE 12

Control Box Calculations for "Shelf-Life" Due to Moisture Absorption

| a | B | RH | WVTR | i | j | w | $P_0$ | $P_1$ | A |
|---|---|---|---|---|---|---|---|---|---|
| 0.0267 | 2.1438 | 0.9 | 20 | 0.075 | 0.18 | 16900 | 49.692 | 49.692 | 71.36 |
| | | | | 0.092 | 0.13 | | | | |
| | | | actual | theoretical | | | | | |
| | constant | | 25.39 | 25.39 | | | | | |
| | equation j | | 2.89 | 47.33 | | | | | |
| | equation i | | 1.44 | 1.12 | | | | | |
| | shelf life (days) | | 36.58 | 1173.27 | | | | | |

Summary:

Based on all the physical data collected, the theoretical calculations performed and the historic values and assumptions available the following conclusions can be drawn:
1. The MVTR box will provide superior performance to the control box under cyclic and tropic environments.
2. The MVTR box, on average, will provide a safety factor greater than:
   a. 7:1 @ 73° F./50% RH
   b. 5.5:1 @ 90° F./90% RH
   c. 4.5:1 @ 90° F./90% RH following exposure to a cyclic environment
   d. 3.9:1 @ 73° F./50% RH following exposure to a cyclic environment
3. The Control box, on average, will provide a safety factor greater than:
   a. 8:1 @ 73° F./50% RH
   b. 5.5:1 @ 90° F./90% RH
   c. 2.9:1 @ 90° F./90% RH following exposure to a cyclic environment
   d. 3.8:1 @ 73° F./50% RH following exposure to a cyclic environment
4. The MVTR box retards the effects of hysteresis.
5. Due to the effectiveness of the MVTR barrier, the expected life cycle of the boxes and the inherent safety factor built into the box design it is not expected that at any time would the MVTR box fail prior to the Control box.

References:
1. Shih, Keith, *Technology Technical Service Report 00.00198T*

While particular embodiments of the invention have been illustrated and described in detail herein, it should be understood that various changes and modifications may be made to the invention without departing from the spirit and intent of the invention as defined by the scope of the appended claims.

What is claimed is:

1. A bulk box adapted to hold large quantities of material for bulk shipment and storage of the material, said bulk box formed from corrugated cardboard having a bottom and upstanding sidewalls and having only a single moisture vapor barrier, said sidewalls having an inner surface and an outer surface and comprising at least one ply of corrugated cardboard;

an outer liner bonded to the outer surface of said sidewalls, said outer liner comprising an inner ply and an outer ply of kraft paper; and said moisture vapor barrier comprising a readily repulpable moisture vapor barrier material between the plies of kraft paper, said repulpable material functioning as both an adhesive to bond the plies together and as a moisture vapor barrier, said outer ply of kraft paper having a felt side exposed exteriorly of the box for accepting printing, said layer of readily repulpable water vapor barrier material resisting penetration of moisture into the cardboard from the ambient atmosphere, thereby increasing the strength and shelf life of the box under humid ambient conditions, and especially under conditions of cyclic changes in ambient humidity.

2. A bulk box as claimed in claim 1, wherein:

the water vapor barrier material is a composition of polymers and ground up mica.

3. A bulk box as claimed in claim 1, wherein:

the water vapor barrier material is a composition of repulpable polymers and ground up mica.

4. A bulk box as claimed in claim 1, wherein:

the layer of water vapor barrier material comprises a single layer applied in a single pass.

* * * * *